(12) United States Patent
Wachi

(10) Patent No.: US 11,443,130 B2
(45) Date of Patent: Sep. 13, 2022

(54) MAKING A FAILURE SCENARIO USING ADVERSARIAL REINFORCEMENT LEARNING BACKGROUND

(71) Applicant: INTERNATIONAL BUSINESS MACHINES CORPORATION, Armonk, NY (US)

(72) Inventor: Akifumi Wachi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 615 days.

(21) Appl. No.: 16/557,453

(22) Filed: Aug. 30, 2019

(65) Prior Publication Data
US 2021/0064915 A1   Mar. 4, 2021

(51) Int. Cl.
| | |
|---|---|
| G06E 1/00 | (2006.01) |
| G06E 3/00 | (2006.01) |
| G06G 7/00 | (2006.01) |
| G06K 9/62 | (2022.01) |
| G05D 1/00 | (2006.01) |
| G06N 20/00 | (2019.01) |
| B60W 50/00 | (2006.01) |

(52) U.S. Cl.
CPC ....... *G06K 9/6215* (2013.01); *B60W 50/0097* (2013.01); *G05D 1/0088* (2013.01); *G06K 9/6256* (2013.01); *G06N 20/00* (2019.01)

(58) Field of Classification Search
CPC .. G06K 9/6215; G06K 9/6256; G06K 9/6262; B60W 50/0097; G05D 1/0088; G06N 20/00; G06N 3/006; G06N 3/08
USPC .......................................................... 706/16
See application file for complete search history.

(56) References Cited

U.S. PATENT DOCUMENTS

2019/0146492 A1   5/2019   Phillips et al.

OTHER PUBLICATIONS

Wachi, Akifumi, "Failure-Scenario Maker for Rule-Based Agent using Multi-agent Adversarial Reinforcement Learning and its Application to Autonomous Driving," arXiv preprint arXiv, Mar. 2019, 7 pages, 1903, 10654.
Schaul, Tom, et al., "Universal value function approximators," International Conference on Machine Learning, Jun. 2015, pp. 1312-1320.
(Continued)

*Primary Examiner* — Stephen P Coleman
(74) *Attorney, Agent, or Firm* — Tutunjian & Bitetto, P.C.; Randall Bluestone

(57) ABSTRACT

Making failure scenarios using adversarial reinforcement learning is performed by storing, in a first storage, a variety of first experiences of failures of a player agent due to an adversarial agent, and performing a simulation of an environment including the player agent and the adversarial agent. It also includes calculating a similarity of a second experience of a failure of the player agent in the simulation and each of the variety of first experiences in the first storage, and updating the first storage by adding the second experience as a new first experience of the variety of first experiences in response to the similarity being less than a threshold. Additionally, the use of adversarial reinforcement learning can include training the adversarial agent by using at least one of the plurality of first experiences in the first storage to generate an adversarial agent having diverse experiences.

25 Claims, 8 Drawing Sheets

(56) References Cited

OTHER PUBLICATIONS

Shalev-Shwartz, Shai, et al., "Safe, multi-agent, reinforcement learning for autonomous driving," arXiv preprint arXiv, Oct. 2016, 13 pages, 1610, 03295.
Manheim, David, "Multiparty Dynamics and Failure Modes for Machine Learning and Artificial Intelligence," Big Data and Cognitive Computing, Jun. 2019, 15 pages, 3, 2.
Lowe, Ryan, et al., "Multi-agent actor-critic for mixed cooperative-competitive environments," Advances in Neural Information Processing Systems, 2017, pp. 6379-6390.
Li, Shihui, et al., "Robust multi-agent reinforcement learning via minimax deep deterministic policy gradient," AAAI Conference on Artificial Intelligence (AAAI), 2019, 9 pages.
Kardell, Simon, et al., "Autonomous vehicle control via deep reinforcement learning," MS thesis, 2017, 73 pages.
Andrychowicz, Marcin, et al., "Hindsight experience replay," Advances in Neural Information Processing Systems, 2017, pp. 5048-5058.

1:   for $e = 1$ to $M$ do
2:     Initialize a random process $N$ for action exploration; then, obtain the initial state $x$
3:     for $t = 1$ to $T$ do
4:       The player executes the action $a_0$ on the basis of the rule $\mu_0$.
5:       For the adversarial NPC $i$, select the action $a_i = \mu_{\vartheta_i}(o_i) + N_t$
6:       NPCs execute the actions $a = (a_1, \ldots, a_{Na})$ and observe their personal reward $rp$ and next state $x_0$
7:       Store $(x, a, rp, ra, x_0)$ in temporal replay storage $D_{tmp}$
8:       $x \leftarrow x_0$
9:     end for
10:    if the player succeeds then
11:      Samples in $D_{tmp}$ are stored in $D^+$; $r^t_i \leftarrow rp^t_i$
13:    else
14:      Identify contributors and allocate adversarial rewards
15:      Calculate similarities of samples
16:      Dissimilar samples in $D_{tmp}$ are stored in $D^-$; $r^t_i \leftarrow rp^t_i + \alpha\, ra^t_i$
17:      Similar samples in $D_{tmp}$ are stored in $D^+$; $r^t_i \leftarrow rp^t_i$
18:    end if
19:    for NPC $i = 1$ to $Na$ do
20:      Randomly choose $\eta(e)S$ samples from $D^+$ and $(1 - \eta(e))S$ samples from $D^-$ and create a random minibatch of $S$ samples
21:      Update the critic and actor
22:    end for
23:    Update the target network parameters for each NPC $i$
24: end for

*FIG. 7*

MAKING A FAILURE SCENARIO USING ADVERSARIAL REINFORCEMENT LEARNING BACKGROUND

BACKGROUND

The present invention relates to making failure scenarios using adversarial reinforcement learning. More specifically, the present invention relates to making diverse failure scenarios by using adversarial reinforcement learning.

To reduce or replace human operations and interventions on various systems, decision-making algorithms are under development. For example, autonomous driving algorithms are under development in the automotive field. In many cases, applications of such decision-making algorithms are safety-critical, and failure thereof can be catastrophic. To prevent such failure after deployment, many kinds of scenarios that may cause decision-making algorithms to fail must be analyzed and used for improving the decision-making algorithms.

SUMMARY

According to an embodiment of the present invention, provided is a computer-implemented method including storing, in a first storage, a variety of first experiences of failures of a player agent due to an adversarial agent. The computer implemented method can include performing a simulation of an environment including the player agent and the adversarial agent, and calculating a similarity of a second experience of a failure of the player agent in the simulation and each of the variety of first experiences in the first storage. The method can also include updating the first storage by adding the second experience as a new first experience of the variety of first experiences in response to the similarity being less than a threshold, and training the adversarial agent by using at least one of the plurality of first experiences in the first storage. By training the adversarial agent using the first experiences in the first storage, a diversity of adversarial agents may be generated.

According to another embodiment of the present invention, provided is a computer program product including one or more computer readable storage mediums collectively storing program instructions that are executable by a processor or programmable circuitry to cause the processor or programmable circuitry to perform operations including storing, in a first storage, a variety of first experiences of failures of a player agent due to an adversarial agent, and performing a simulation of an environment including the player agent and the adversarial agent. The operations can also include calculating a similarity of a second experience of a failure of the player agent in the simulation and each of the variety of first experiences in the first storage, and updating the first storage by adding the second experience as a new first experience of the variety of first experiences in response to the similarity being less than a threshold. Additionally, the operations can include training the adversarial agent by using at least one of the variety of first experiences in the first storage to generate a diversity of adversarial agents.

According to another embodiment of the present invention, provided is an apparatus including a processor or a programmable circuitry; and one or more computer readable mediums collectively including instructions that, when executed by the processor or the programmable circuitry, cause the processor or the programmable circuitry to store, in a first storage, a variety of first experiences of failures of a player agent due to an adversarial agent. The apparatus can also include instructions that cause the processor to perform a simulation of an environment including the player agent and the adversarial agent; calculate a similarity of a second experience of a failure of the player agent in the simulation and each of the plurality of first experiences in the first storage. The instructions can also cause the processor to update the first storage by adding the second experience as a new first experience of the variety of first experiences in response to the similarity being less than a threshold, and train the adversarial agent by using at least one of the variety of first experiences in the first storage. The instructions can also cause the processor to generate a diversity of adversarial agents.

According to another embodiment of the present invention, an apparatus includes a first storage configured to store a variety of first experiences of failures of a player agent due to an adversarial agent, and a simulating section configured to perform a simulation of an environment including the player agent and the adversarial agent. The apparatus can also include a calculating section configured to calculate a similarity of a second experience of a failure of the player agent in the simulation and each of the variety of first experiences in the first storage, as well as an updating section configured to update the first storage by adding the second experience as a new first experience of the variety of first experiences in response to the similarity being less than a threshold. Further, the apparatus can include a training section configured to train the adversarial agent by using at least one of the variety of first experiences in the first storage, and to generate a diversity of adversarial agents.

The summary clause does not necessarily describe all necessary features of the embodiments of the present invention. Not all features described in the summary are essential to the present invention. The present invention may also be a sub-combination of the features described above.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 7 shows pseudocode that lays out an exemplary adversarial reinforcement learning algorithm according to an embodiment of the present invention.

DETAILED DESCRIPTION

Figure 1:
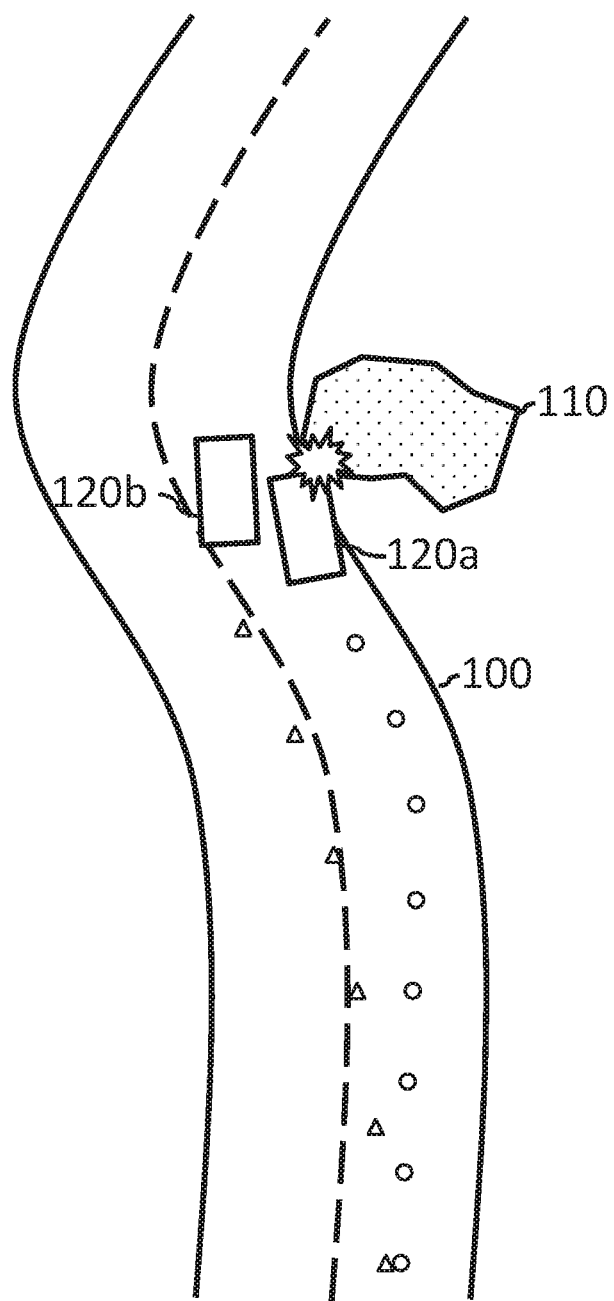
FIG. 1 is a diagram showing an example of a simulation experiment according to an embodiment of the present invention.

Hereinafter, example embodiments of the present invention will be described. The example embodiments shall not limit the invention according to the claims, and the combinations of features described in the embodiments are not necessarily essential to the invention.

Adversarial reinforcement learning (RL) can be used to create failure scenarios of decision-making algorithms. In adversarial reinforcement learning, adversarial RL-based agents (i.e., non-player characters or NPCs) are trained to cause the agent using the decision-making algorithm under test (i.e. player) fail. However, a simple adversarial reinforcement learning tends to create many obvious and trivial failure scenarios. Accordingly, a computer implemented method including a plurality of experiences for reinforcement learning is provided.

The computer-implemented method can include outputting a plurality of first experiences of failures of the player agent collected in the first storage. In this way, a variety of experiences that caused failures of the player agent can be analyzed for improving the behavior of the player agent.

The calculating the similarity can further include extracting a feature of the second experience and a feature of each of the plurality of first experiences, and calculating the similarity of the second experience and each of the plurality of first experiences based on the feature of the second experience and the feature of each of the plurality of first experiences. By extracting a feature of an experience and calculating the similarity based on the extracted features, the similarity can be fit to distinguish whether the failure situations of failure experiences are similar or different.

The computer-implemented method can further include storing, in a second storage, a plurality of third experiences, each third experience being a success of the player agent or a failure of the player agent in which the similarity is equal to or larger than the threshold, wherein the training includes training the adversarial agent by using at least one of the plurality of first experiences in the first storage and at least one of the plurality of third experiences in the second storage. In this way, a diversity of the adversarial agents can be obtained from the mixture of diverse experiences as a training dataset.

The training can include training each adversarial agent of a plurality of the adversarial agents by using a set of the first experiences randomly selected from the plurality of first experiences in the first storage and a set of the third experiences randomly selected from the plurality of third experiences in the second storage, wherein the random selections are performed for each adversarial agent. In this way, the adversarial agents may be trained differently based on different training datasets.

The computer-implemented method can further include updating the second storage by adding the second experience as a new third experience in response to the similarity being equal to or larger than the threshold. In this way, third experiences of success of the player agent may also be partially used to train the adversarial agents.

The player agent can be an autonomous driving vehicle algorithm and the adversarial agent may be a machine learning model of a simulated vehicle.

FIG. 1 shows an example of a simulation experiment according to an embodiment of the present invention. In this example, an autonomous driving vehicle 120a and an adversarial vehicle 120b are simulated.

Road 100 is a road of roughly south-north direction in the simulation environment. Obstacle 110, a rock for example, is located beside road 100 in the simulation environment. Vehicle 120a is a vehicle controlled by a decision-making algorithm under test. In the simulation environment, vehicle 120a is implemented as a player agent. Vehicle 120b is an adversarial vehicle that is trained to cause vehicle 120a to fail. In the simulation environment, vehicle 120b is implemented as an adversarial agent.

In this example, vehicle 120a moves from the south to the north on road 100, and vehicle 120b moves from the south to the north on road 100 after vehicle 120a. In the simulation, positions of vehicles 120a-b for each time step in the simulation time period are calculated. The positions of vehicle 120a for each time step are illustrated by circle marks, and the positions of vehicle 120b for each time step are illustrated by triangle marks. Vehicle 120b tries to overtake vehicle 120a, vehicle 120a avoids vehicle 120b by shifting to the right, and this causes vehicle 120a to collide with obstacle 110.

Here, "experience" is a result of taking actions by agents in a time step. An "experience" at a certain time step may include initial states of agents at the time step, actions taken by agents in the time step, and rewards received at least by one of the adversarial agents in the time step. An "experience" of one agent at a certain time step may include an initial state of the agent at the time step, an observation of the agent at the time step, an action taken by agent in the time step, and a reward received by the agent in the time step. A "scenario" includes a set of experiences in consecutive time steps within a time period. A "scenario" may include a set of experiences from the beginning to the end of the simulation time period.

In a simple adversarial reinforcement learning process, adversarial agents (e.g. an agent of vehicle 120b) receive a reward (i.e. adversarial reward) only if it causes the player agent (e.g. an agent of vehicle 120a) to fail. Here, a reward should be understood to be an incentive to achieve a goal or perform an action, including, but not limited to, being implemented as a code that causes an adversarial agent to favor one possible set of behaviors over another. However, if adversarial agents can receive rewards only if the player agent fails, then adversarial agents may effectively be trained to simply collide with the player agent in the easiest manner (e.g. directly rush for the player agent from any direction).

To avoid this problem, the adversarial agent in this application may also receive a personal reward. The personal reward is a reward for achieving the purpose of the adversarial agent regardless of disturbing the player agent. For example, an adversarial agent may receive a personal reward for reaching a destination of the adversarial agent. In another example, the adversarial agent may receive a personal reward if it does not collide with the player agent or other agents.

By assigning personal rewards to the adversarial agents, the adversarial agents try to achieve their own purpose while trying to cause the player agent fail. In the example of FIG. 1, vehicle 120b cuts in front of vehicle 120a after vehicle 120b overtakes vehicle 120a, but vehicle 120b avoids a collision with vehicle 120a. Therefore, vehicle 120b can continue traveling to its own destination and may also receive a personal reward.

A simple adversarial reinforcement learning also tends to create similar failure scenarios. For example, two or more similar failure scenarios may be obtained if the initial locations of agents are similar, and thereby the actions taken by the agents may be almost the same in respective failure scenarios. In such cases, the failure situations of the failure scenarios can be very similar. To improve the decision-making algorithm of the player agent, it is preferable to create diverse failure scenarios instead of creating similar failure scenarios.

To avoid this problem, new failure experiences that are not similar to a failure experience already obtained are collected and then used for training adversarial agents. In one embodiment, zero or low adversarial rewards may be assigned to new failure experiences that are similar to a failure experience already obtained. In this case, the adversarial agents can be trained to seek different kinds of failures.

Figure 2:
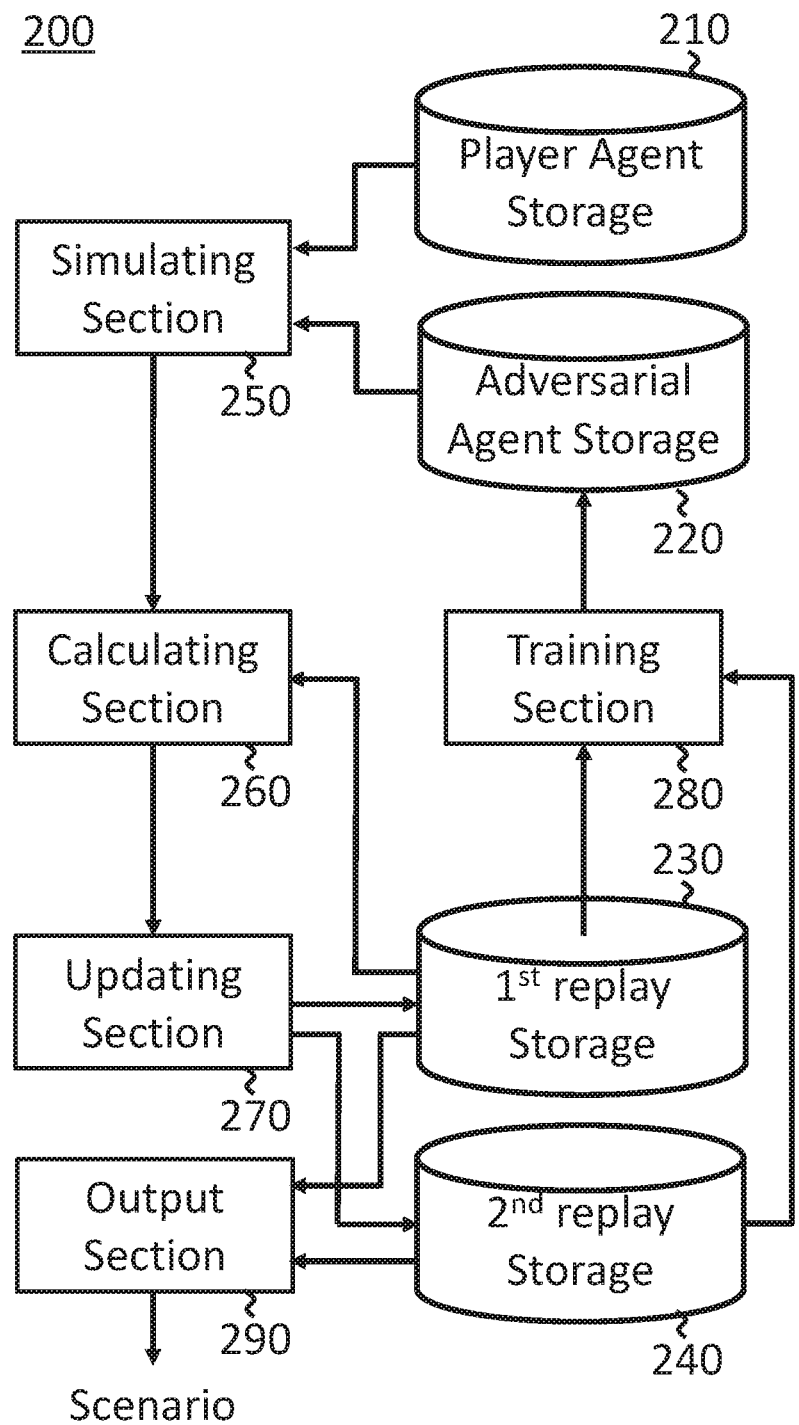
FIG. 2 is a schematic diagram showing an apparatus according to an embodiment of the present invention.

FIG. 2 shows apparatus 200 according to an embodiment of the present invention. Apparatus 200 includes player agent storage 210, adversarial agent storage 220, first replay storage 230, second replay storage 240, simulating section 250, calculating section 260, updating section 270, training section 280, and outputting section 290.

Player agent storage 210 stores an algorithm or a model of a player agent. In this embodiment, the player agent is an autonomous driving vehicle algorithm. The player agent may be controlled by a rule-based algorithm which may be under development. In a rule based algorithm, actions taken by the player agent in certain situations are defined by a rule, and the player agent is programmed to take actions defined by the rule in such situations.

In another embodiment, the algorithm or the model is used for two or more player agents. In a large scale implementation, player agent storage 210 may store two or more algorithms each of which is used for one or more player agent. In this case, different kinds of algorithms for player agents are simulated in a simulation environment.

Adversarial agent storage 220 stores a model of an adversarial agent. Adversarial agent storage 220 may store a plurality of models used for a plurality of respective agents. A model of an adversarial agent includes a policy to determine an action based on at least an observation of the adversarial agent. In this embodiment, the models are machine learning models of simulated vehicles.

First replay storage 230 is an example of a first storage. First replay storage 230 stores a plurality of experiences of failures of a player agent due to one or more adversarial agents (e.g., failures caused by, or resulting from the actions of, one or more adversarial agents). The plurality of experiences stored in first replay storage 230 is an example of a plurality of first experiences. In this embodiment, first replay storage 230 stores failure experiences that are not similar to each other.

Second replay storage 240 is an example of a second storage. Second replay storage 240 stores a plurality of experiences. Each experience stored in second replay storage 240 is a success of the player agent or a failure of the player agent that is similar to one or more experiences stored in first replay storage 230. The plurality of experiences stored in second replay storage 240 is an example of a plurality of third experiences.

Simulating section 250 is connected to player agent storage 210 and adversarial agent storage 220 in a manner such that simulating section 250 can communicate with player agent storage 210 and adversarial agent storage 220. Simulating section 250 performs (e.g., generates and runs) a simulation of an environment including the player agent and the adversarial agents. Simulating section 250 initializes the player agent and the adversarial agents, and performs a simulation of each time step from the start to the end of a simulation time period. In each time step, simulating section 250 generates an observation for each agent representing what the agent can see or sense in the environment at the time step.

The observation can include at least a portion of states of other agents that can be observed by the observing agent. For example, the observation can include at least one of distances, speeds, directions, and movements of other agents observed by the observing agent. The observation can also include at least a portion of the state of the observing agent. For example, the observation can include at least one of a speed, a direction, a position on the road, the destination of the observing agent. The observation can also include other information of the environment that can be observed from the observing agent. For example, this information can include at least one of a road condition, a weather condition, and so on.

Then, simulating section 250 determines the actions of agents. Simulating section 250 obtains the rule-based algorithm of the player agent from player agent storage 210, and executes the rule-based algorithm. Simulating section 250 determines the action of the player agent as a result of executing the rule-based algorithm using the observation of the player agent as input. Simulating section 250 generates a new state of the player agent from the current state and the determined action.

Simulating section 250 also obtains the model of each adversarial agent from adversarial agent storage 220. Simulating section 250 determines the action of the adversarial agent as a behavior of the model under the condition that the observation of the adversarial agent is provided. Simulating section 250 generates a new state of the adversarial agent from the current state and the determined action.

Simulating section 250 determines whether the player agent has failed. In one embodiment, a failure of the player agent is, for example, at least one of a collision, an accident, and a violation of traffic regulations.

Calculating section 260 is connected to simulating section 250 and first replay storage 230 in a manner such that calculating section 260 can communicate with simulating section 250 and first replay storage 230. Calculating section 260 calculates a reward of each adversarial agent for each time step based on the result of the simulation. Calculating section 260 assigns a personal reward to an adversarial agent for achieving its purpose regardless of disturbing the player agent. If the player agent failed in the simulation, then calculating section 260 may calculate a similarity of an experience (also referred to as "a second experience") of a failure of the player agent in the current simulation and each of the plurality of experiences in the first replay storage 230. If the current failure experience is not similar to any of the failure experiences stored in first replay storage 230, calculating section 260 also assigns an adversarial reward to an adversarial agent that caused a failure of the player agent. If the player agent failed in the simulation but the current failure experience is similar to a failure experience stored in first replay storage 230, calculating section 260 might not assign an adversarial reward or might assign a low adversarial reward. Calculating section 260 can determine whether two experiences are similar or not by checking whether the similarity between the two experiences is not less than a threshold or less than a threshold (e.g., by comparing a value of the similarity between the two experiences to a threshold similarity value).

Updating section 270 is connected to calculating section 260, first replay storage 230, and second replay storage 240 in a manner such that updating section 270 can communicate with calculating section 260, first replay storage 230, and second replay storage 240. Updating section 270 updates the first replay storage 230 and the second replay storage 240 based on the result of the simulation. Updating section 270 updates first replay storage 230 by adding the current failure experience as a new experience of the plurality of experiences in first replay storage 230 in response to the similarity being less than a threshold (e.g., when the current experience is not similar to any of the experiences in first replay storage 230). Updating section 270 updates second replay storage 240 by adding the current failure experience as a new experience in second replay storage 240 in response to the similarity being equal to or larger than the threshold (e.g., when the current experience is similar to one or more of the experiences in first replay storage 230). Updating section 270 may also update second replay storage 240 by adding the current success experience as a new experience in second replay storage 240.

Training section 280 is connected to first replay storage 230, second replay storage 240, and adversarial agent storage 220 in a manner that training section 280 can communicate with first replay storage 230, second replay storage 240, and adversarial agent storage 220. Training section 280 trains the adversarial agents by using at least one of the experiences in first replay storage 230. Training section 280 may also train the adversarial agents by using at least one of the experiences in second replay storage 240.

Outputting section 290 is connected to first replay storage 230 and second replay storage 240 in a manner such that outputting section 290 can communicate with first replay storage 230 and second replay storage 240. Outputting section 290 outputs a plurality of experiences of failures of the player agent collected in first replay storage 230. Outputting section 290 may output the experiences of failures by outputting failure scenarios, each of which includes a set of consecutive experiences and at least one experience is a failure experience. Outputting section 290 may compose a scenario by obtaining related experiences stored in first replay storage 230 and second replay storage 240, and sorting the obtained experiences in chronological order.

In this embodiment, apparatus 200 can assign a personal reward to an adversarial agent regardless of disturbing the player agent. Therefore, apparatus 200 can train the adversarial agent to disturb the player agent in a more natural fashion (e.g., not by just rushing to the player agent to collide with the player agent).

Apparatus 200 can collect failure experiences which are not similar to other failure experiences in first replay storage 230 and train adversarial agents based on the collected failure experiences. Therefore, apparatus 200 can generate adversarial agents having diverse experiences.

Figure 3:
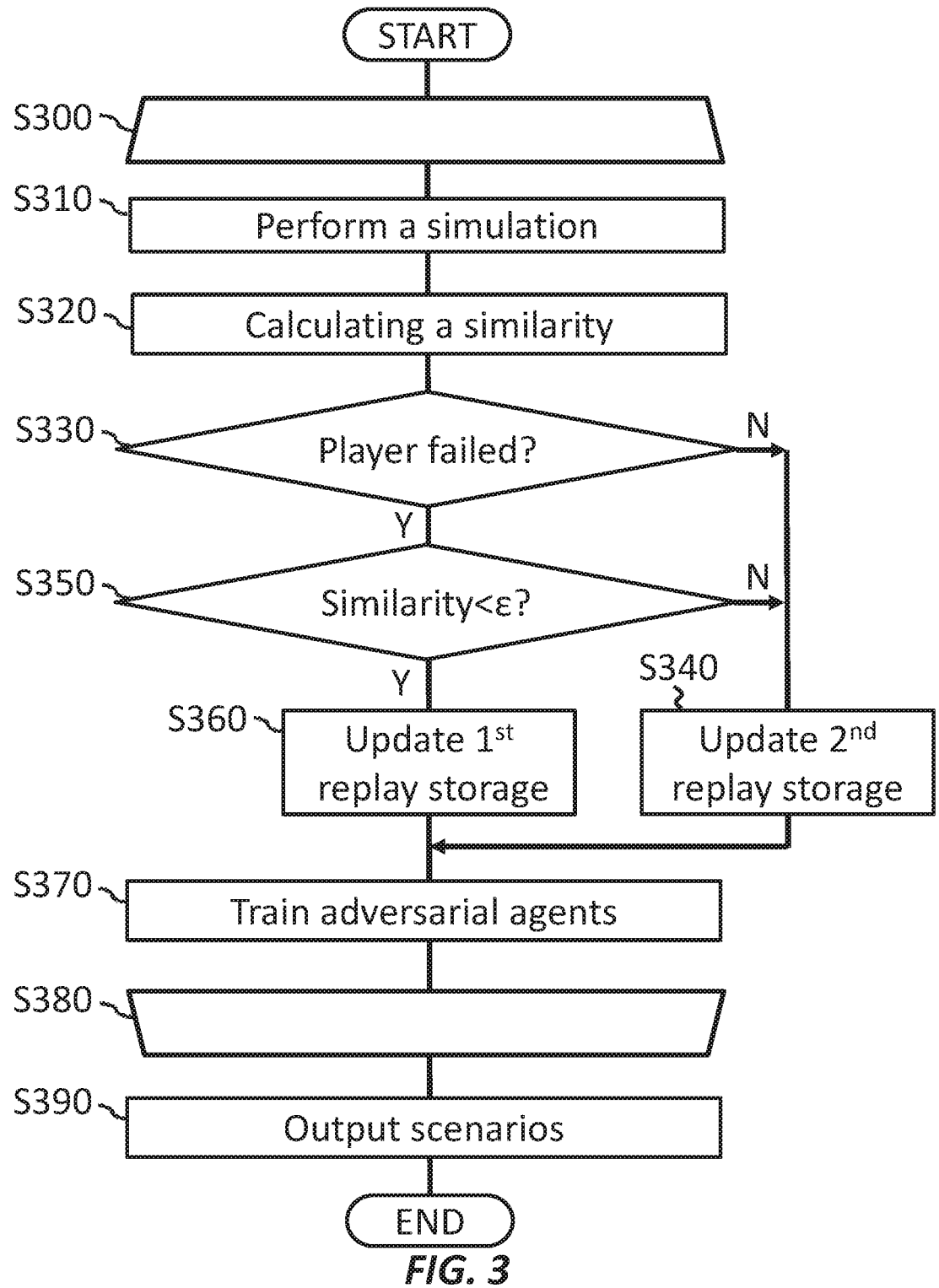
FIG. 3 is an operational block/flow diagram showing an operational flow according to an embodiment of the present invention.

FIG. 3 shows an operational flow according to an embodiment of the present invention. The operations of FIG. 3 can be performed by, for example, apparatus 200 and its components that were explained in reference to FIG. 2. While the operational flow of FIG. 3 will be explained in reference to apparatus 200 and its components, the operational flow can be performed by other apparatus having different components as well.

Apparatus 200 initializes the operational flow at S300 and repeats simulation and training processes S310 (Step 310) to S370 (Step 370) one or more times to improve the adversarial agents. Apparatus 200 can repeat the simulation and the training process for a predetermined number of times. In an implementation, apparatus 200 can repeat the simulation and training process until a predetermined condition is satisfied.

In one embodiment, at S310, simulating section 250 performs a simulation of an environment including the player agent and the adversarial agents. Simulating section 250 performs the simulation for each time step from the start to the end of the simulation time period.

At S320, calculating section 260 calculates similarities of each experience in the current simulation and failure experiences stored in first replay storage 230. In some embodiments, calculating section 260 can calculate the similarities only if the experience of interest is a failure experience.

Apparatus 200 can perform operations between S320 to S360 for each experience obtained in the simulation. At S330, updating section 270 determines whether the player agent failed in the experience of interest. If the player did not fail at the experience of interest (e.g., No in S330), e.g., the experience of interest is not a failure experience, updating section 270 updates, at S340, second replay storage 240 by adding the experiences of interest as a new experience in second replay storage 240. In some embodiments, updating section 270 can add experiences other than failure experiences in second replay storage 240 even if the player agent failed in the current simulation.

If the player failed in the experience of interest (e.g., Yes in S330), updating section 270 can determine, at S350, whether the experience of interest is not similar to any experience in first replay storage 230. If all the similarities calculated in S320 are less than a threshold value ε, updating section 270 determines that the experience of interest is deemed to be not similar to any experience in first replay storage 230. If at least one similarity calculated in S320 is equal to or higher than a threshold value ε, the experience of interest is deemed to be similar to at least one experience in first replay storage 230.

If the experience of interest is deemed to not be similar to the experiences in first replay storage 230 (e.g., Yes in S350), updating section 270 updates, at S360, first replay storage 230 by adding the experience of interest as a new experience in first replay storage 230. If the experience of interest is deemed to be similar to at least one experience in first replay storage 230 (e.g., Yes in S350), updating section 270 updates, at S340, second replay storage 240 by adding the experience of interest in second replay storage 240. In some embodiments, calculating section 260 assigns higher adversarial rewards to the experience of interest if the similarity is less than the threshold, and lower adversarial rewards to the experience of interest if the similarity is equal to or higher than the threshold. In this embodiment, calculating section 260 can assign no adversarial reward to the experience of interest if the similarity is equal to or higher than the threshold.

At S370, training section 280 trains the adversarial agents by using at least one experience stored in first replay storage 230. Training section 280 can also train the adversarial agent(s) by using at least one experience stored in second replay storage 240.

At S380, apparatus 200 proceeds to S310 to perform a simulation by using the trained adversarial agents until the loop exiting condition is satisfied. At S390, outputting section 290 outputs a plurality of experiences of failures of the player agent.

Figure 4:
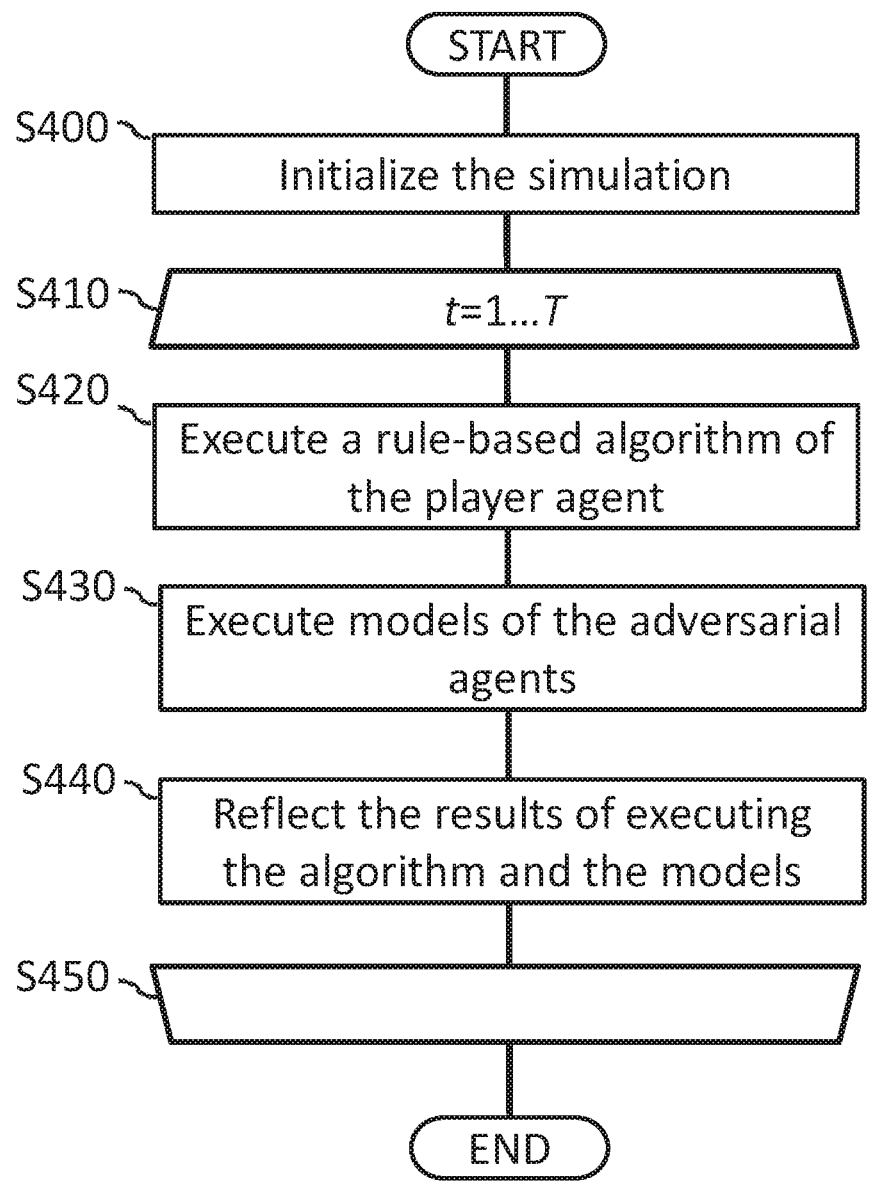
FIG. 4 is an operational block/flow diagram showing an operational flow for performing a simulation according to an embodiment of the present invention.

FIG. 4 shows an operational flow for performing a simulation according to an embodiment of the present invention. The operations of FIG. 4 can be performed by, for example, apparatus 200 and its components that were explained in reference to FIG. 2. The operations of FIG. 4 can also be performed as S310 of FIG. 3. While the operational flow of FIG. 4 will be explained in reference to apparatus 200 and its components, the operational flow can be performed by another apparatus having different components as well.

At S400, simulating section 250 initializes the player agent and the adversarial agents. Specifically, simulating section 250 initializes the state of each agent. In the case where an agent represents a vehicle, the state of an agent may include at least one state parameter such as an initial position, a destination, an initial direction, an initial speed, and a condition of the vehicle (e.g., fuel level, charge level, and so on). Simulating section 250 can initialize some parameters by using predetermined values (e.g. initialize the position and the destination with fixed values). Simulating section 250 can also initialize some parameters by using random values (e.g. initialize the speed with random values).

Simulating section 250 can also initialize the model in response to performing the simulation for the first time. The model can be a machine learning model, such as a reinforcement learning (RL) model, a recursive neural network (RNN) model, and the like. In this embodiment, the model can, as an example, be an RL model and can adopt the actor-critic method. In another embodiment, the model can adopt Q-learning or other methods.

In case where the RL model adopts the actor-critic method, simulating section 250 determines the action from the state of the agent and the observation of the agent based on a stochastic policy $\mu_{\theta_i}$, where $\theta_i$ is a parameter of policy $\mu$ for adversarial agent i. Simulating section 250 can initialize, in S400, policy $\mu_{\theta_i}$ in response to performing the simulation for the first time.

At S410, simulating section 250 starts a loop including S420 to S440 for each time step from time t=1 to T. Here, T can be a predetermined value representing the maximum time step of the simulation.

At S420, simulating section 250 obtains the rule-based algorithm of the player agent from player agent storage 210. Simulating section 250 generates an observation of the player agent and executes the rule-based algorithm by using the observation as input parameters of the algorithm. By executing the rule-based algorithm, simulating section 250 determines an action of the player agent. If an agent represents a vehicle, the action may include at least one of accelerator control, brake control, direction change, and any other behaviors that may change the state of the player agent. Simulating section 250 determines the next state of the player agent based on the current state and determined action.

At S430, simulating section 250 obtains a model of each adversarial agent from adversarial agent storage 220. Simulating section 250 generates an observation of each adversarial agent. Simulating section 250 determines the action of the adversarial agent as a behavior of the model under the condition that the observation of the adversarial agent is provided. Simulating section 250 determines the next state of each adversarial agent based on the current state and determined action of the adversarial agent.

At S440, simulating section 250 reflects the results of executing the algorithm and the models. Simulating section 250 updates, for each agent, the current state to the next state determined in S420 or S430. Simulating section 250 determines whether the player agent has failed or not. For example, simulating section 250 can detect a collision of the player agent with another agent or an obstacle (e.g. vehicle 120). Simulating section 250 can also determine whether each agent reached their destination.

Simulating section 250 repeats S420 to S440 until time t becomes T. Simulating section 250 can terminate the loop at S450 if a terminating condition is satisfied. For example, simulating section 250 can terminate the loop if all agents have either reached their destinations or became involved in collisions.

Figure 5:
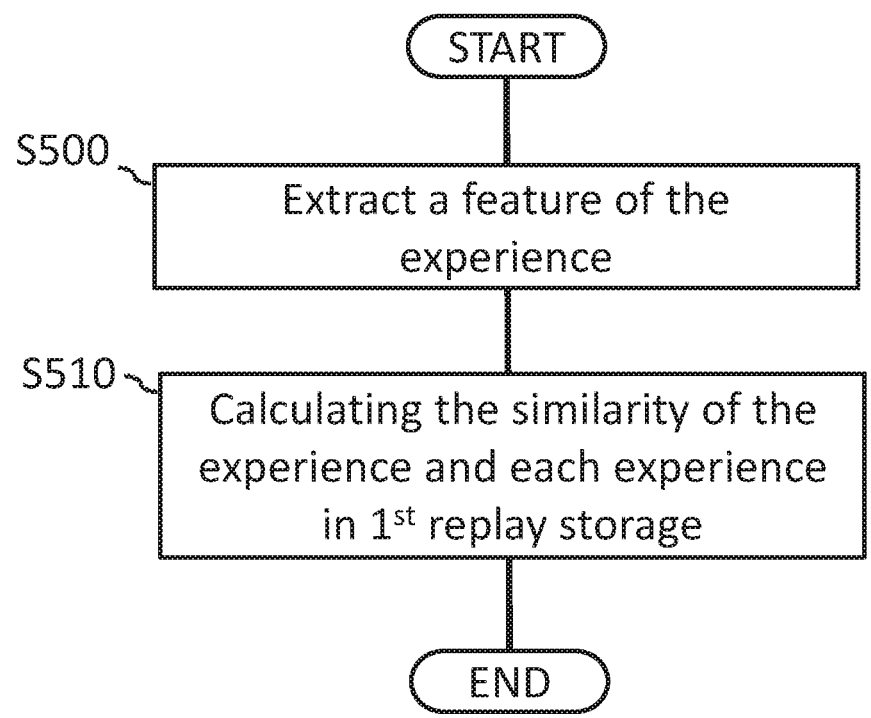
FIG. 5 is an operational block/flow diagram showing an operational flow for calculating a similarity according to an embodiment of the present invention.

FIG. 5 shows an operational flow for calculating a similarity according to an embodiment of the present invention. The operations of FIG. 5 can be performed by, for example, apparatus 200 and its components that were explained in reference to FIG. 2. The operations of FIG. 5 can also be performed as S320 of FIG. 3. While the operational flow of FIG. 5 will be explained in reference to apparatus 200 and its components, the operational flow can be performed by other apparatus having different components as well.

Calculating section 260 calculates similarities of each experience in the current simulation and failure experiences stored in first replay storage 230. For each experience in the current simulation, calculating section 260 performs S500 and S510. At S500, calculating section 260 extracts a feature of the experience of interest and a feature of each experience in first replay storage 230. In this embodiment, an experience is represented by parameters including the current state x, the determined action a, a personal reward rp, an adversarial reward ra, and the next state x'. Calculating section 260 may extract the feature of an experience by extracting some parameters from the experience. The manufacturer or a user of apparatus 200 may select parameters to be extracted in advance. For example, calculating section 260 extracts the position of the player agent from the current state x or the next state x' as the feature of the experience. In another implementation, calculating section 260 extracts the position and the direction of the player agent from the experience. In yet another implementation, calculating section 260 extracts, from the experience, the position and the direction of the player agent and adversarial agents that caused the failure of the player agent.

At S510, calculating section 260 calculates the similarity of the experience of interest and each of the plurality of experiences in first replay storage 230 based on the feature of the experience of interest and the feature of each of the plurality of experiences in first replay storage 230. "Similarity" represents how similar two features are, and may have a higher value if the two features are more similar. "Similarity" can be measured by using a distance between or a dissimilarity of (e.g., difference between) two features. "Similarity" is higher if a distance or a dissimilarity of two features is lower. In this embodiment, calculating section 260 calculates the similarity of two features by calculating a distance between two features. In this embodiment, calculating section 260 determines that the similarity is less than a threshold if the distance is equal to or higher than a threshold. If each feature is a vector, calculating section 260 may calculate a weighted vector distance between two features.

By extracting some parameters from an experience to generate features of experiences and calculating a similarity based on the features, apparatus 200 can select important parameters for calculating a similarity that can be used to distinguish whether the failure situations of two failure experiences are similar or different. Apparatus 200, as well as the operational flow of the method shown in FIG. 5, can also reduce the computational cost of, time needed for, and energy used for calculating the similarity between experiences.

Figure 6:
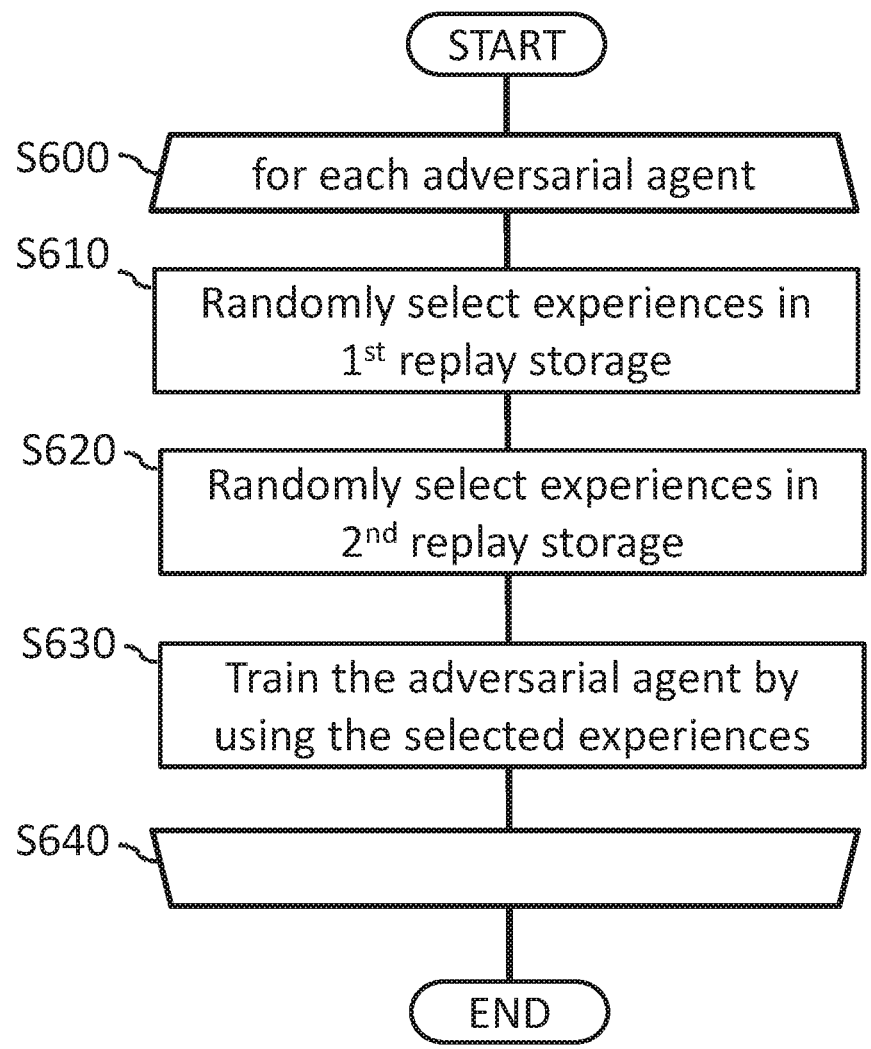
FIG. 6 is an operational block/flow diagram showing an operational flow for training adversarial agents according to an embodiment of the present invention.

FIG. 6 shows an operational flow for training adversarial agents according to an embodiment of the present invention.

The operations of FIG. 6 can be performed by, for example, apparatus 200 and its components that were explained in reference to FIG. 2. The operations of FIG. 6 can also be performed as S370 of FIG. 3. While the operational flow of FIG. 6 will be explained in reference to apparatus 200 and its components, the operational flow can be performed by other apparatus having different components as well.

Training section 280 performs a loop from S610 to S630 for each adversarial agent of the plurality of adversarial agents (S600). At S610, training section 280 selects a set of experiences from the plurality of experiences in first replay storage 230. In this embodiment, training section 280 randomly selects experiences in first replay storage 230. In this case, the random selections may be performed for each adversarial agent and thereby different sets of experiences may be selected for different adversarial agents.

At S620, training section 280 selects a set of experiences from the plurality of experiences in second replay storage 240. In this embodiment training section 280 randomly selects experiences in second replay storage 240. In this case, the random selections may also be performed for each adversarial agent and thereby different sets of experiences may be selected for different adversarial agents.

At S630, training section 280 trains the adversarial agent of interest by using the set of experiences selected at S610 and S620. Training section 280 repeats S610 to S630 until it finishes training every adversarial agent at S640.

By training adversarial agents based on a set of experiences in first replay storage 230 and a set of experiences in second replay storage 240, apparatus 200 can obtain a diversity of adversarial agents. This is because even though the player failed, zero or low adversarial rewards are assigned to failure experiences that are similar to other failure experiences. Such failure experiences are stored in second replay storage 240, and can be selected to train adversarial agents. Since adversarial agents are not rewarded for such failure experiences, adversarial agents will tend to seek other failure experiences to receive adversarial rewards.

In this embodiment, training section 280 an receive a ratio of the number of experiences from first replay storage 230 (or second replay storage 240) to the total number of selected experiences. Training section 280 can receive another ratio that is similar to this ratio (e.g. a ratio of the number of experiences from first replay storage 230 to the number of experiences from second replay storage 240 and so on).

FIG. 7 shows an exemplary adversarial reinforcement learning algorithm according to an embodiment of the present invention. The algorithm of FIG. 7 can be performed by, for example, apparatus 200 and its components that were explained in reference to FIG. 2. The algorithm of FIG. 7 can also be performed as operations of FIGS. 3 to 6. While the algorithm of FIG. 7 will be explained in reference to apparatus 200 and its components, the algorithm can be performed by other apparatus having different components as well.

Apparatus 200 repeats line 2 to line 21 for each episode e=1, . . . , M, where M is a predetermined number of episodes. Line 2 may correspond to S400 in FIG. 4. In line 2, simulating section 250 initializes a random process N for action exploration. This random process N is used for exploring actions in line 5. Simulating section 250 may reduce randomness of the random process N in association with the increase of episode e. Then, simulating section 250 initializes the state x for every agent.

Simulating section 250 repeats line 3 to line 9 for each time step t=1, . . . , T. This loop may correspond to S410 to S450 in FIG. 4. Line 4 may correspond to S420 in FIG. 4. In line 4, simulating section 250 generates an observation of the player agent ("player" in FIG. 7) and executes the rule-based algorithm. Based on the rule $\mu_0$ defined by the rule-based algorithm, simulating section 250 determines an action $a_0$ of the player agent. Then, simulating section 250 determines the next state of the player agent based on the current state and determined action.

Line 5 can correspond to a portion of S430 in FIG. 4. For each adversarial agent, simulating section 250 generates an observation and determines an action of the adversarial agent. In this embodiment, simulating section 250 selects action $a_i$ of adversarial agent i (non-player character or NPC i in FIG. 7) based on the policy $\mu_{\theta_i}$ of the adversarial agent i that generates an action from the observation o of adversarial agent i. In another embodiment, the policy $\mu_{\theta_i}$ can further use at least one parameter of the state $x_i$ of the adversarial agent i to generate an action. Simulating section 250 can also add randomness in selecting the action $a_i$ by using random distribution $N_t$ for the purpose of exploration. Simulating section 250 can change random distribution $N_t$ by, for example, reducing the distribution as t increases.

Line 6 can also correspond to a portion of S430 in FIG. 4. In the simulation performed by simulating section 250, the adversarial agents execute actions $a=(a_1, \ldots, a_{Na})$ and observe personal rewards rp. Simulating section 250 determines next state $x_0$ from the current state x and the actions of the player agent and the adversarial agents.

Lines 7 and 8 can correspond to a portion of S440 in FIG. 4. In line 7, simulating section 250 stores the current experience, which is a set of (x, a, rp, $x_0$) (e.g., a current state, an action, a personal reward, and a next state), in temporal experience storage $D_{tmp}$ ("temporal replay buffer" in FIG. 7). In line 8, simulating section 250 reflects the results of executing the algorithm and the models by updating the current state x to the next state $x_0$ determined in line 6.

Line 10 can correspond to S330 in FIG. 3. In line 10, updating section 270 determines whether the player agent succeeded or failed in the simulation. If the player agent succeeded in the simulation, updating section 270 stores samples of succeeded experiences stored in the temporal experience storage $D_{tmp}$ in second replay storage 240 ($D^+$) in line 11, which may correspond to S340 in FIG. 3. Updating section 270 assigns personal reward $rp^r_i$ to adversarial agent i at each time step t.

If the player agent failed in the simulation, in line 14, updating section 270 identifies one or more adversarial agents that contributed to the failure of the player agent. In an implementation, updating section 270 can request simulating section 250 to re-run the simulation with the player agent and a single adversarial agent. If the player agent failed in this simulation, only that single adversarial agent contributed to the failure. If there is no single adversarial agent that contributed to the failure, updating section 270 may request simulating section 250 to re-run the simulation with the player agent and two adversarial agents. If the player agent failed in this simulation, the two adversarial agents contributed to the failure. Updating section 270 can increase the number of adversarial agents for re-running the simulation until the adversarial agents that contributed to the failure are found, or until the number of adversarial agents reaches an upper limit. In another implementation, updating section 270 may select one or more adversarial agents within a certain range from the player agent at the time step that the player agent failed.

Then, updating section 270 allocates an adversarial reward to the one or more adversarial agents that contributed to the failure. Updating section 270 may distribute the adversarial reward to the adversarial agents that contributed to the failure based on the distance to the player agent. For example, updating section 270 may allocate a higher share of the adversarial reward to an adversarial agent located closer to the player agent.

Line 15 can correspond to S320 in FIG. 3. However, line 15 (corresponding to S320) is performed after line 10 (corresponding to S330) in this embodiment. In line 15, calculating section 260 calculates a similarity of each experience in the simulation and the failure experiences stored in first replay storage 230.

Line 16 can correspond to S350 and S360 in FIG. 3. Updating section 270 stores experiences in the temporal experience storage $D_{tmp}$ in first replay storage 230 ($D^-$) if the experiences are not similar to any experience in first replay storage 230. Updating section 270 assigns personal reward $rp^t_i$ and contributed portion ($\alpha$) of adversarial reward $ra^t_i$ to adversarial agent i at the time step t for each failure experience.

In line 17, updating section 270 stores experiences in the temporal experience storage $D_{tmp}$ in second replay storage 240 ($D^+$) if the experiences are similar to some of the experiences in first replay storage 230. In this case, updating section 270 might not assign an adversarial reward even for the failure experiences.

Lines 19 and 22 can correspond to S600 and S640 in FIG. 6 respectively. Training section 280 repeats lines 20 to 21 for each adversarial agent i=1, . . . , Na, where Na is the number of the adversarial agents.

In line 20, training section 280 selects η(e)S experiences randomly from the plurality of experiences in first replay storage 230 and selects (1-η(e))S experiences randomly from the plurality of experiences in second replay storage 240. Here, S is a number of experiences (e.g., samples) to be used to train the adversarial agent of interest. η(e) (0< η(e)<1) is a ratio of the number of experiences from first replay storage 230 to S. Training section 280 may change η(e) in different episode e. For example, η(e) may be decreased when e exceeds a threshold. Training section 280 creates a random mini-batch of S samples for training the adversarial agent of interest.

In line 21, training section 280 trains the adversarial agent of interest. In this embodiment, apparatus 200 adopts an actor-critic model as the model of the adversarial agents. The model of the adversarial agent can include a neural network representing action-value function $Q_i^{\mu_i}(x, \alpha)$ for the adversarial agent i. Training section 280 trains the neural network to decrease or minimize an objective function $\mathcal{L}(\theta_i)$ by updating the parameters $\theta_i$ of the neural network. An example of the objective function is the following expression (1).

$$\mathcal{L}(\theta_i) = E_{x,a,r,x'}\left[(Q_i^\mu(x, a_{0:N}) - y)^2\right], \quad (1)$$

$$y = r_i + \gamma Q_i^{\mu'}(x', a'_{0:N})|_{a'_0 = \mu'_0(O_0), a'_i = \mu'_i(O_i)}$$

$\mu'=\{\mu_0, \mu_{\theta'_1}, \ldots, \mu_{\theta'_N}\}$ is the set of target policies with delayed parameters $\theta'_i$. $E[\ ]$ represents an expected value. Training section 280 updates the parameters $\theta_i$ to approximate $Q_i^\mu(x, a_{0:N})$ to y, which is the sum of the reward of the current experience and the future action-value function $Q_i^{\mu'}(x', a'_{0:N})$ after taking actions $\alpha'_{0:N}$ by agents, and the future action-value function is discounted by the discount rate γ. Training section 280 can determine the actions $\alpha'_{0:N}$ by using the current policies μ' under training. Training section 280 can determine the future action-value function $Q_i^{82\ '}(x', a'_{0:N})$ by using the neural network under training.

Training section 280 updates the policy $\mu_{\theta_i}$ (i.e. the actor) based on the action-value function $Q_i^\mu(x, a_{0:N})$ (i.e. the critic). Training section 280 may update the policy $\mu_{\theta_i}$ to increase the probability of selecting an action that can maximize the action-value function $Q_i^\mu(x, a_{0:N})$.

In Line 23, training section 280 update the target network parameters for each adversarial agent i. Training section 280 may employ a soft update shown in the following expression (2) where τ is an update rate (0<τ<1).

$$\theta'_i = \tau \theta'_i + (1-\tau)\theta'_i \quad (2)$$

In this embodiment, apparatus 200 assigns an adversarial reward to a failure experience that is not similar to any other experiences in first replay storage 230. Apparatus 200 does not assign an adversarial reward to a failure experience that is similar to an experience in first replay storage 230. By creating a training dataset including experiences in first replay storage 230 and second replay storage 240, apparatus 200 can generate adversarial models having diverse experiences.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 8:
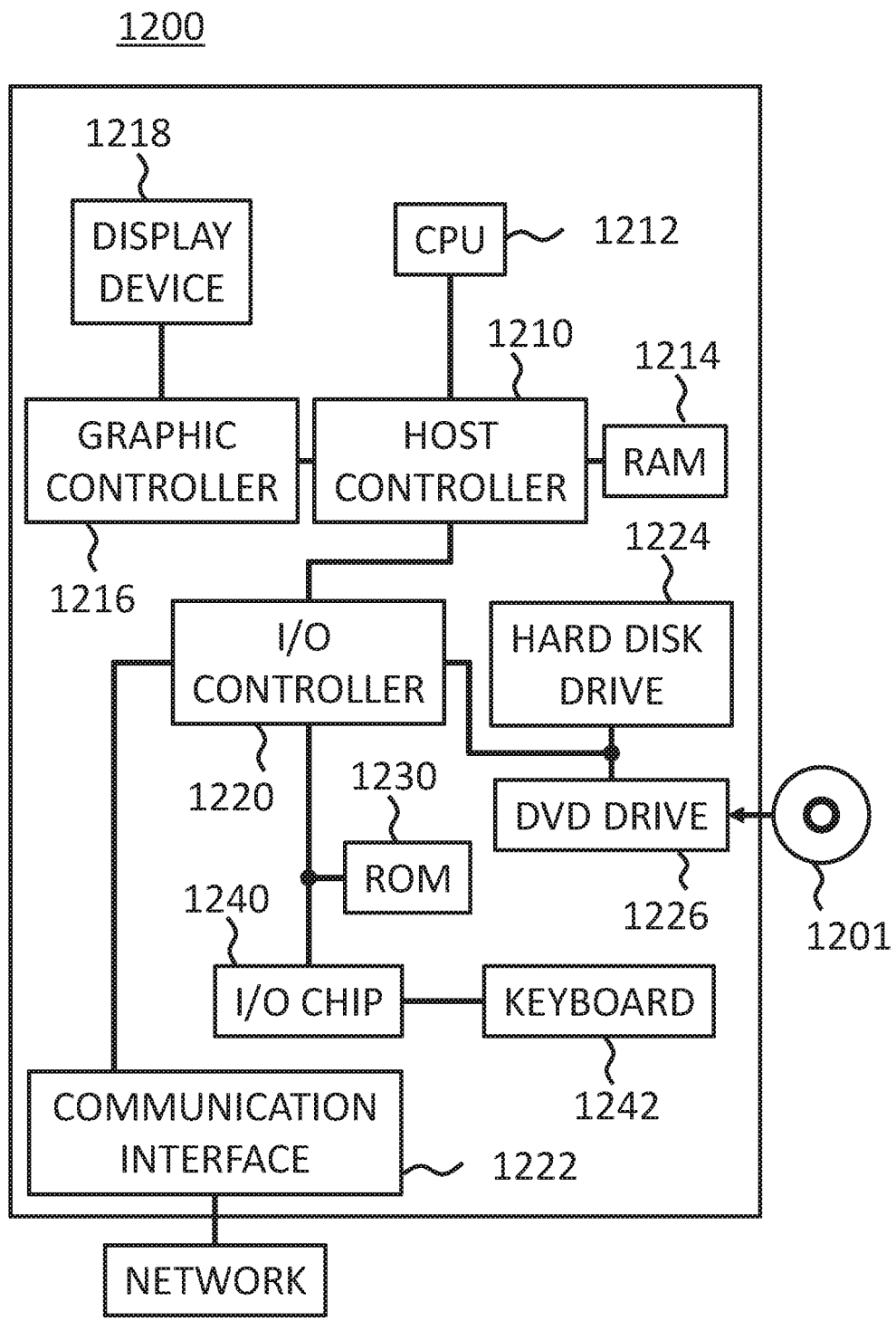
FIG. 8 is a schematic diagram showing an exemplary hardware configuration of a computer according to an embodiment of the present invention.

FIG. 8 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein. A program that is installed in the computer 1200 can cause the computer 1200 or its respective subcomponents to function as or perform operations associated with apparatus 200 of FIG. 2 or with player agent storage 210, adversarial agent storage 220, first replay storage 230, second replay storage 240, simulating section 250, calculating section 260, updating section 270, training section 280, and outputting section 290 respectively.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

Many of the embodiments of the present invention include artificial intelligence, and include neural networks in particular. Some of the foregoing embodiments describe specific types of neural networks. However, a neural network usually starts as a configuration of random values. Such untrained neural networks must be trained before they can be reasonably expected to perform a function with success. Once trained, a neural network may not require further training. In this way, a trained neural network is a product of the process of training an untrained neural network.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

What is claimed is:

1. A computer-implemented method comprising:
   storing, in a first storage, a plurality of first experiences of failures of a player agent due to an adversarial agent;
   performing a simulation of an environment including the player agent and the adversarial agent;
   calculating a similarity of a second experience of a failure of the player agent in the simulation and each of the plurality of first experiences in the first storage;
   updating the first storage by adding the second experience as a new first experience of the plurality of first experiences in response to the similarity being less than a threshold; and
   training the adversarial agent by using at least one of the plurality of first experiences in the first storage to generate an adversarial agent having diverse experiences.

2. The computer-implemented method of claim 1, further comprising outputting the plurality of first experiences of failures of the player agent collected in the first storage.

3. The computer-implemented method of claim 1, wherein the calculating the similarity includes:
   extracting a feature of the second experience and a feature of each of the plurality of first experiences; and
   calculating the similarity of the second experience and each of the plurality of first experiences based on the feature of the second experience and the feature of each of the plurality of first experiences.

4. The computer-implemented method of claim 1, wherein the performing includes executing a rule-based algorithm of the player agent and reflecting the result of the execution of the rule-based algorithm in the simulation.

5. The computer-implemented method of claim 1, wherein the player agent is an autonomous driving vehicle algorithm and the adversarial agent is a machine learning model of a simulated vehicle.

6. The computer-implemented method of claim 1, further comprising storing, in a second storage, a plurality of third experiences, each third experience being a success of the player agent or a failure of the player agent in which the similarity is equal to or larger than the threshold, wherein the training includes training the adversarial agent by using at least one of the plurality of first experiences in the first storage and at least one of the plurality of third experiences in the second storage.

7. The computer-implemented method of claim 6, wherein the training includes training each adversarial agent of a plurality of the adversarial agents by using a set of first experiences randomly selected from the plurality of first experiences in the first storage and a set of third experiences randomly selected from the plurality of third experiences in the second storage, wherein the random selections are performed for each adversarial agent.

8. The computer-implemented method of claim 6, further comprising updating the second storage by adding the second experience as a new third experience in response to the similarity being equal to or larger than the threshold.

9. The computer-implemented method of claim 8, wherein the calculating includes assigning higher adversarial reward to the second experience if the similarity is less than the threshold and lower adversarial reward to the second experience if the similarity is equal to or higher than the threshold.

10. The computer-implemented method of claim 9, wherein the adversarial agent receives a personal reward and the adversarial reward, the personal reward being a reward for achieving a purpose of the adversarial agent regardless of whether or not the adversarial agent disturbs the player agent.

11. A computer program product including one or more computer readable storage mediums collectively storing program instructions that are executable by a processor or programmable circuitry to cause the processor or programmable circuitry to perform operations comprising:
   storing, in a first storage, a plurality of first experiences of failures of a player agent due to an adversarial agent;
   performing a simulation of an environment including the player agent and the adversarial agent;
   calculating a similarity of a second experience of a failure of the player agent in the simulation and each of the plurality of first experiences in the first storage;
   updating the first storage by adding the second experience as a new first experience of the plurality of first experiences in response to the similarity being less than a threshold; and
   training the adversarial agent by using at least one of the plurality of first experiences in the first storage to generate an adversarial agent having diverse experiences.

12. The computer program product of claim 11, wherein the operations further comprise outputting a plurality of first experiences of failures of the player agent collected in the first storage.

13. The computer program product of claim 11, wherein the calculating the similarity includes:
 extracting a feature of the second experience and a feature of each of the plurality of first experiences; and
 calculating the similarity of the second experience and each of the plurality of first experiences based on the feature of the second experience and the feature of each of the plurality of first experiences.

14. The computer program product of claim 11, wherein the player agent is an autonomous driving vehicle algorithm and the adversarial agent is a machine learning model of a simulated vehicle.

15. The computer program product of claim 11, wherein the operations further comprise storing, in a second storage, a plurality of third experiences, each third experience being a success of the player agent or a failure of the player agent in which the similarity is equal to or larger than the threshold, wherein the training includes training the adversarial agent by using at least one of the plurality of first experiences in the first storage and at least one of the plurality of third experiences in the second storage.

16. The computer program product of claim 15, wherein the training includes training each adversarial agent of a plurality of the adversarial agents by using a set of first experiences randomly selected from the plurality of first experiences in the first storage and a set of third experiences randomly selected from the plurality of third experiences in the second storage, wherein the random selections are performed for each adversarial agent.

17. The computer program product of claim 15, wherein the operations further comprising updating the second storage by adding the second experience as a new third experience in response to the similarity being equal to or larger than the threshold.

18. An apparatus comprising:
 a processor or a programmable circuitry; and
 one or more computer readable mediums collectively including instructions that, when executed by the processor or the programmable circuitry, cause the processor or the programmable circuitry to:
  store, in a first storage, a plurality of first experiences of failures of a player agent due to an adversarial agent;
  perform a simulation of an environment including the player agent and the adversarial agent;
  calculate a similarity of a second experience of a failure of the player agent in the simulation and each of the plurality of first experiences in the first storage;
  update the first storage by adding the second experience as a new first experience of the plurality of first experiences in response to the similarity being less than a threshold; and
  train the adversarial agent by using at least one of the plurality of first experiences in the first storage to generate an adversarial agent having diverse experiences.

19. The apparatus of claim 18, wherein the instructions further cause the processor or the programmable circuitry to output a plurality of first experiences of failures of the player agent collected in the first storage.

20. The apparatus of claim 18, wherein the calculating the similarity includes:
 extracting a feature of the second experience and a feature of each of the plurality of first experiences; and
 calculating the similarity of the second experience and each of the plurality of first experiences based on the feature of the second experience and the feature of each of the plurality of first experiences.

21. The apparatus of claim 18, wherein the player agent is an autonomous driving vehicle algorithm and the adversarial agent is a machine learning model of a simulated vehicle.

22. The apparatus of claim 18, wherein the instructions further cause the processor or the programmable circuitry to store, in a second storage, a plurality of third experiences, each third experience being a success of the player agent or a failure of the player agent in which the similarity is equal to or larger than the threshold,
 wherein the training includes training the adversarial agent by using at least one of the plurality of first experiences in the first storage and at least one of the plurality of third experiences in the second storage.

23. The apparatus of claim 22, wherein the training includes training each adversarial agent of a plurality of the adversarial agents by using a set of first experiences randomly selected from the plurality of first experiences in the first storage and a set of third experiences randomly selected from the plurality of third experiences in the second storage, wherein the random selections are performed for each adversarial agent.

24. The apparatus of claim 22, wherein the instructions further cause the processor or the programmable circuitry to update the second storage by adding the second experience as a new third experience in response to the similarity being equal to or larger than the threshold.

25. An apparatus comprising:
 a first storage configured to store a plurality of first experiences of failures of a player agent due to an adversarial agent;
 a simulating section configured to perform a simulation of an environment including the player agent and the adversarial agent;
 a calculating section configured to calculate a similarity of a second experience of a failure of the player agent in the simulation and each of the plurality of first experiences in the first storage;
 an updating section configured to update the first storage by adding the second experience as a new first experience of the plurality of first experiences in response to the similarity being less than a threshold; and
 a training section configured to train the adversarial agent by using at least one of the plurality of first experiences in the first storage to generate an adversarial agent having diverse experiences.

\* \* \* \* \*